Oct. 10, 1950  J. A. CALDWELL  2,525,094
RECORDING INSTRUMENT
Filed June 21, 1946  2 Sheets-Sheet 2
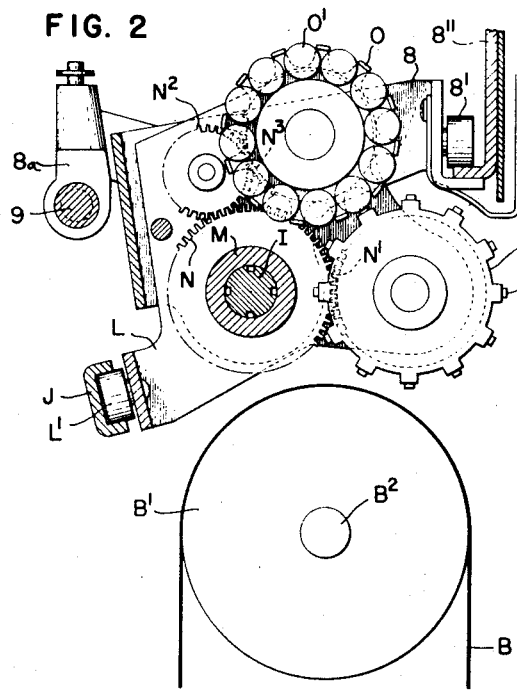
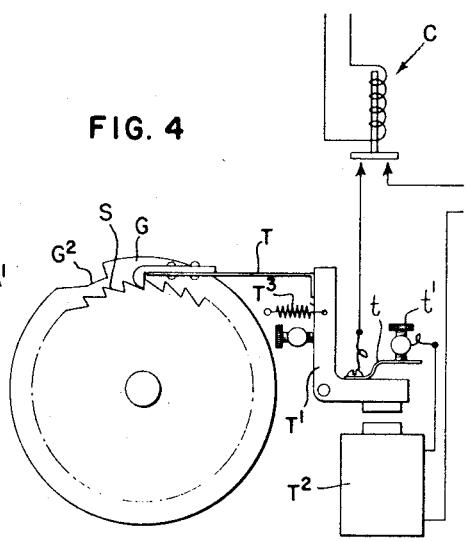
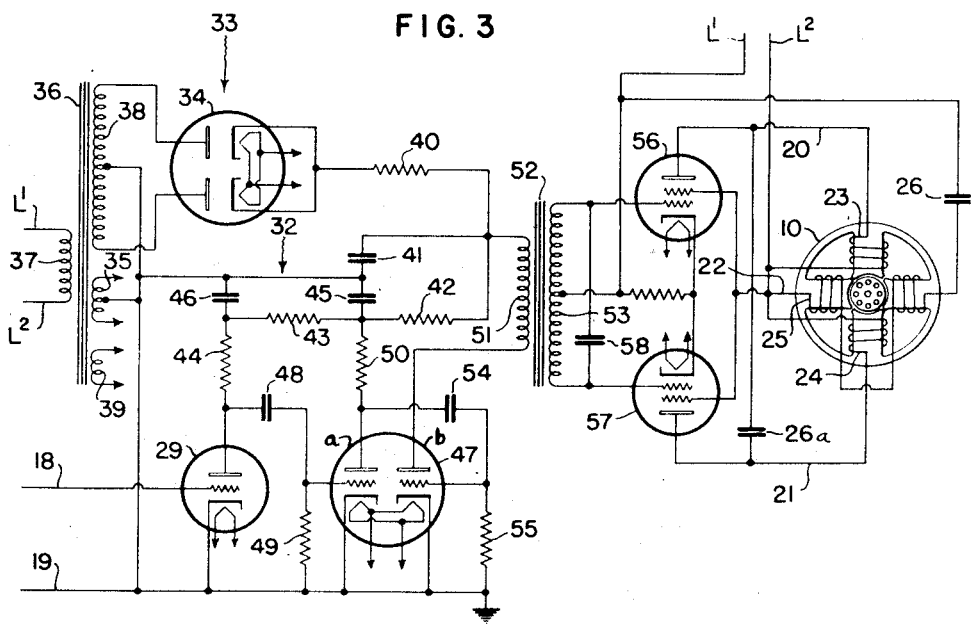
INVENTOR.
JOHN A. CALDWELL
BY
ATTORNEY.

Patented Oct. 10, 1950

2,525,094

UNITED STATES PATENT OFFICE 2,525,094

RECORDING INSTRUMENT

John A. Caldwell, Philadelphia, Pa., assignor, by mesne assignments, to Minneapolis-Honeywell Regulator Company, Minneapolis, Minn., a corporation of Delaware Application June 21, 1946, Serial No. 678,394

7 Claims. (Cl. 346—33)

1

The present invention relates to self-balancing measuring and recording apparatus, and the general object of the invention is to provide improved mechanism for effecting a recording or analogous operation as soon as the measuring system is brought back into balance after having been unbalanced.

The invention may be used with especial advantage in so-called multiple recorders of well known types in which the constituents of a series of thermocouples or other voltage sources are successively connected, one at a time, to a single self-balancing and recording instrument, and a primary object of the invention is to provide improved mechanism which after measuring and recording the value of one thermocouple or other voltage source, automatically actuates a selector switch to disconnect the voltage source just measured from the measuring circuit and to connect another of said sources to that circuit.

A specific and practically important object of the invention is to provide effective mechanism for attaining the above mentioned general object of the invention, in which the printing or analogous operation is effected by a normally inactive relay motor, which is brought into operation on the completion of each rebalancing operation.

Multiple measuring and recording instruments operating automatically to make the intervals at which the recording operation is effected dependent upon the time required for rebalancing the measuring circuit, are disclosed in the Harrison Patent No. 1,898,183, of February 21, 1933, and in various later patents, including the hereinafter mentioned Moore Patent 2,358,243, of September 12, 1944. In every such instrument heretofore devised of which I have knowledge, the printing operation as well as the operation of the selector switch has been effected by means of a constantly rotating power or actuated shaft, to which the printing mechanism or both the printing mechanism and selector switch mechanism were automatically connected on the attainment of balance.

The use of a relay motor in accordance with the present invention contributes substantially to mechanical simplification. The relay motor employed may take various forms. Usually it is an electric motor which may be an intermittently operating electromagnetic relay including a pawl and ratchet mechanism but in the preferred form of the invention the relay motor is a rotatable electric motor.

The present invention may be used with ad-

2 vantage in connection with self-balancing measuring and recording apparatus of widely different forms. However, the invention was primarily devised, and is especially adapted for use in self-balancing potentiometric measuring systems of known types in which the rebalancing operation is effected by a reversible electric motor, and a specific object of the present invention is to control the energization of the relay motor by means automatically responsive to variations in the energizing current supplied to the rebalancing motor, and operating to energize and deenergize the relay motor as the rebalancing motor is deenergized and energized.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the inventon.

Of the drawings:

Fig. 2 is an elevation, partly in section, of recorder and selector switch mechanisms actuated by a relay motor;

Fig. 3 is a diagram illustrating details of an electronic device included in Fig. 1; and Fig. 4 is a diagrammatic representation of a form of the invention including an electromagnetic relay motor of the pawl and ratchet type.

Figs. 1 and 2 illustrate an embodiment of the invention in a multiple recording, self-balancing potentiometer of the so-called continuous operating type, including a reversible rebalancing motor which operates continuously to effect a corrective adjustment of the slide wire contact whenever the measuring circuit is unbalanced.

Figure 1:
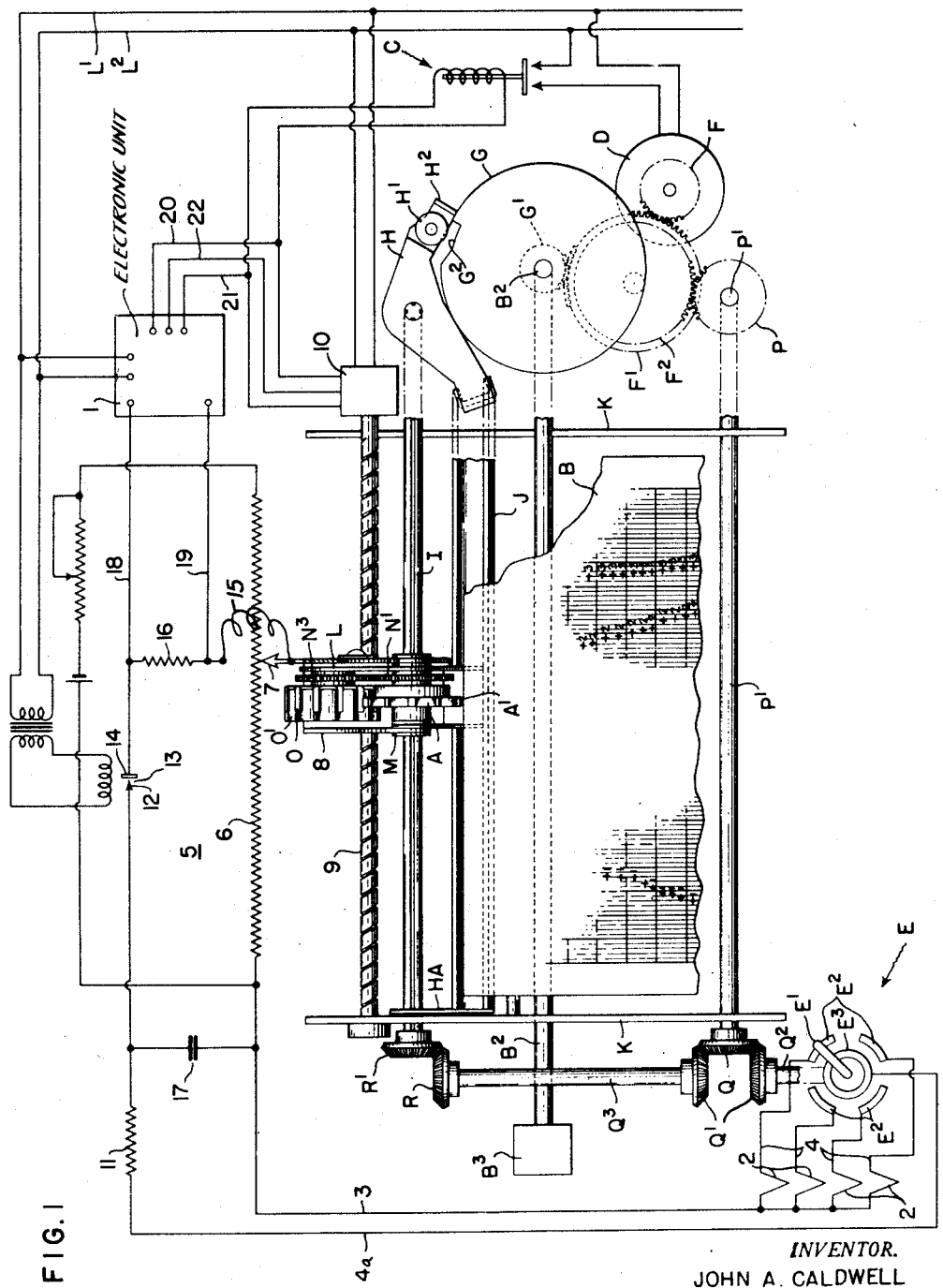
Fig. 1 is a diagrammatic representation of a self-balancing potentiometric, multiple recorder instrument.

Fig. 1 of the drawings illustrates in schematic form, an arrangement including an electronic device 1, shown in detail in Fig. 3, for producing effects in accordance with the extent of unbalance of a potentiometer network which controls the electronic device and is unbalanced in accordance with variations in a quantity to be measured, and in which, because of the small magnitude of the unbalanced electromotive forces, it is not practical nor desirable to have the said effects produced directly by the potentiometric network.

More specifically, an arrangement is illustrated in Fig. 1 for measuring and recording the temperatures of furnaces (not shown) in the interior of each of which an individual thermocouple 2 is arranged to respond to slight changes in furnace temperature. Each of the thermocouples 2 may be located at a distance from the remainder of the measuring apparatus and may have its terminals connected by conductors 3, 4 and 4a and a selector switch E to the terminals of a null point potentiometric network 5. The potentiometric network 5 includes a slide wire resistance 6 and an associated contact 7, which is capable of being moved along the length of the slide wire, and may be of any suitable type, such as the Brown potentiometric network disclosed in Patent 1,898,124 issued to Thomas R. Harrison on February 21, 1933.

The movable contact 7 of the potentiometer is attached to a suitable carriage 8. As shown, the carriage 8 comprises a nut 8a engaging a threaded rod 9 which is rotated in one direction or the other by a reversible motor 10 under the control of the thermocouple 2 being measured, to move the contact 7 along the slide wire resistance 6 and thereby rebalance the potentiometer when the latter is unbalanced. The carriage 8 is guided for movement longitudinally of the shaft 9 by means including a roller 8' journalled on the carriage and running along the track rail formed by a flange of a stationary frame member 8" which is parallel to and laterally displaced from the shaft 9. The carriage 8 also supports marking mechanism including a printing wheel A which is supported by a tilting frame L. The latter is journalled on an indexing shaft I parallel to the shaft 9 to tilt and turn the printing wheel into and out of engagement with a record sheet B, as hereinafter described. The chart B is supported and advanced by a feed roll B', the shaft $B^2$ of which is rotated by a constant speed motor $B^3$.

As shown, one terminal of the thermocouple 2 being measured is connected by conductor 3 to the left end of the slide wire resistance 6, and the other terminal of the thermocouple is connected by the conductor 4, selector switch E, conductor 4a and resistance 11 to one terminal 12 of an interrupter or converting device 13 of known type. The second terminal 14 of the interrupter is connected to the contact 7 by a conductor 15 in which a resistance 16 is inserted. The resistance 11 and an associated condenser 17 connecting the end of resistance 11 remote from the thermocouple to the left end of the slide wire resistance 6, cooperate to prevent hunting of the system.

The terminals of the resistance 16 are connected to the input terminals 18 and 19 of the electronic device 1. The latter controls the energization of the motor 10 through output circuit conductors 20, 21 and 22. The manner in which the motor is energized and controlled through the electronic device 1, shown in detail in Fig. 3, is hereinafter described. At this point it is noted, however, that the electronic device 1 and one winding of the motor 10 are energized by alternating current supply conductors L' and $L^2$, which also supply current to the energizing winding of the interrupter 13, and that in the balanced condition of the system, the rebalancing motor 10 is at rest and an electromagnetic switch C having its terminals connected between the conductors 20 and 21 is then deenergized. When the system is unbalanced the switch C is energized by current flowing through the winding of the switch C between the conductors 20 and 21.

The energization and deenergization of the switch C, respectively deenergizes and energizes an electric relay motor D provided for the purposes of the present invention. In the arrangement shown, the motor D turns in one direction, and revolves continuously during each period in which it is energized. In each of its operations, the motor D moves the printing element A into and out of engagement with the record chart B, and thereafter operates the selector switch E to disconnect from the measuring circuit the thermocouple 2 previously connected thereto, and to connect another thermocouple 2 to said circuit. If the thermocouple so connected into the circuit happens to have the same voltage as the thermocouple disconnected from the circuit, the motor 10 may remain deenergized and the energization of the motor D will continue and thus promptly repeat the printing and selector switch operations. In general, however, the voltage of a thermocouple freshly connected to the measuring circuit will differ from that of the thermocouple previously connected to the circuit. In consequence, each operation of the selector switch E customarily unbalances the measuring circuit, re-energizes the motor 10, and thus deenergizes the motor D which then remains inactive until the motor 10 has rebalanced the measuring circuit.

The motor D gives rotative indexing movements to the printing wheel A and to the selector switch E and also tilts the printing wheel into and out of engagement with the chart B. The frame L carrying the wheel A is tilted through means including a gear wheel F carried by the shaft of the motor D and in mesh with a gear F'. The latter is also in mesh with a small gear G' shown as coaxial with and rigidly connected to a rotatable disc G. The latter is journalled on the shaft $B^2$ and is formed with a peripheral notch $G^2$. A lever H journalled on the shaft I, is biased for turning movement into a position in which a roller H' carried by the lever engages the peripheral edge of the disc G. For convenience of illustration, the planes of the lever H, disc G, gears F and F', and the hereinafter mentioned gear P are shown in Fig. 1 as parallel to the shafts I and 9, whereas, in fact, those planes are transverse to said shafts.

The peripheral edge of the disc G extends circularly about the axis of the disc, except where the latter is formed with one or more notches $G^2$, one being shown in Fig. 1. When the roller H' is in engagement with the circular portion of the disc edge, a transverse front end portion $H^2$ of the lever H is separated from said edge portion by a small clearance space. When the disc movement first brings the roller H' into register with the notch, as shown in Fig. 1, the lever H turns only far enough to bring the lever end portion $H^2$ into engagement with the circular edge portion of the disc. A further small turning movement of the disc G permits the lever end $H^2$ and roller H' to turn into engagement with the bottom wall of the notch $G^2$. The forward end wall of the notch $G^2$, then adjacent to the end portion $H^2$, is substantially radial, so that the turning movement of lever H is not substantially retarded until it engages the bottom wall of the notch.

The relatively rapid movement of the printing wheel A into printing engagement with the chart B is followed by a more gradual return movement of the printing wheel A as the roller H' rides up on the inclined rear wall of the notch G². The lever H moves the printing wheel into and out of engagement with the chart B through a device J attached to the rear end of the lever H, and shown as a channel bar parallel to the shafts 9, I and B², all of which extend through, and are journalled in, the instrument side frames K. The lever H is located at the right-hand side of the instrument as seen in Fig. 1, and the bar J is pivotally connected to the shaft I at the opposite side of the instrument through an arm HA, which may be a duplicate of the portion of the arm H connecting the bar J to the shaft I.

The tilting frame L which supports the printing wheel A and associated parts is pivotally supported by the shaft I through a sleeve M which surrounds and is splined on the shaft I so that the sleeve turns with the shaft when the latter is given its angular indexing adjustments hereinafter described. The sleeve M is journalled in the carriage 8 and shares the movement of the latter longitudinally of the shafts 9 and I. As shown, the printing wheel is provided with printing element projections A' distributed about its periphery and bearing different letters, numbers or other identifying symbols, at their outer ends. Angular indexing adjustments of the shaft I bring different printing elements A' into printing position.

As is shown in Fig. 2, the angular adjustment of the shaft I gives a corresponding angular adjustment to the printing wheel A through a gear connection comprising a spur gear N coaxial with, and secured to the sleeve M which is splined on the shaft I, and a gear N' coaxial with and secured to the printing wheel A which is pivotally connected to the supporting member L. The latter also supports an inking wheel O and gears N² and N³ through which the rotation of the shaft I gives appropriate rotative movements to the wheel O. The gear N² is an intermediate gear in mesh with the gear N and with the gear N³, the latter being coaxial with and rigidly secured to the inking wheel O.

The inking wheel O carries a circular series of inking pads O', one for each of the different printing elements A'. The inking pads O' may or may not supply inks of different colors to the respectively corresponding printing elements A'. The number of printing elements A' on the wheel A should be suitably related to the number of different thermocouples 2 which are to be successively measured. In some cases, there may be as many printing elements A' as thermocouples 2, and in other cases, there may be two or more times as many printing elements A' as there are thermocouples 2 to be measured. As shown, there are four thermocouples 2 and twelve elements A', and the record of the value of each thermocouple is made in part by one, and in part by the others of three different printing elements A'.

As shown in Fig. 1, the relay motor D gives the shaft I angular indexing adjustments through the mechanism which also adjusts the selector switch E. That mechanism comprises a spur gear P in mesh with a small gear F² which is coaxial with and secured to the gear F' through which the motor D rotates the disc G. The gear P is secured to the right-hand end of a shaft P' which extends through the two side frames K of the instrument. At its left-hand end the shaft P' carries a bevel gear Q which is shown in mesh with two bevel gears Q', one secured to one end of a selector switch shaft Q², and the other secured to a shaft Q³ through which the indexing shaft I is rotated.

The shaft Q² carries, and gives angular movements to a selector switch contact arm E'. For convenience of illustration, the apparent plane of movement of the arm E' is shown in Fig. 1 as parallel, instead of transverse, to the shaft Q². The rotative movement of the arm E' causes the latter to engage successively each of a plurality of contacts E² arranged at intervals about the axis of rotation of the contact arm E'. The contact arm E' connects each of the contacts E² when in engagement with the latter, to a circular contact E³. As shown, each of the contacts E² is connected through a corresponding conductor 4 to one terminal of a corresponding thermocouple 2. The opposite terminals of the thermocouples 2 are all connected to the same conductor 3, and thereby to one end of the resistance 6. The circular switch contact E³ is connected to the conductor 4a and thereby to the resistance 11. The shaft Q³ which is connected at one end to a bevel gear Q', is connected at its opposite end to a bevel gear R which meshes with a bevel gear R', secured to the shaft I.

In operation, the relay motor D is energized and set into rotation by the closure of the switch C automatically effected as measuring circuit balance is attained at the end of each rebalancing action. Each rotative movement of the motor D so initiated, continues until a printing operation is effected and continues thereafter until the selector switch arm E' is moved out of engagement with the contact E² previously engaged and into engagement with the adjacent contact E². Ordinarily, the apparatus is so proportioned that the arm E' moves into engagement with the said adjacent contact E² as soon as the roller H' moves out of the notch G² and onto the circular edge portion of the disc G. As previously explained, the measuring circuit will usually be unbalanced when a thermocouple is freshly connected to said circuit with the result of re-energizing the rebalancing motor and deenergizing the relay motor D. If the measuring circuit is not so unbalanced the motor D will continue to operate and the printing, indexing and selector operations will be repeated until the measuring circuit is unbalanced.

In the arrangement shown by way of example and illustration in Fig. 1, there are four thermocouples 2 and the various spur and bevel gears are so proportioned that the angular speed of the disc G is four times that of the selector switch contact arm E' and twelve times that of the indexing shaft I. In consequence, for each complete rotation of the disc G and resultant printing operation, the contact E' will move out of engagement with one contact E² and into engagement with an adjacent contact E². It hardly needs to be explained that the relation between the extent of the angular movements of the disc G, selector switch arm E' and printing wheel A, may be varied as conditions make desirable by the use of cooperating sets of gears having different gear ratios and by providing the disc G with two or more notches G² instead of a single notch.

Further references to the details of the printing, selector switch and indexing mechanisms shown diagrammatically in Fig. 1, seem unnecessary as those details embody nothing claimed as novel herein, and differ essentially from printing, selector switch and indexing mechanisms shown in the previously mentioned Moore Patent 2,358,243, only in respect to their actuating means. In said Moore patent said mechanisms are actuated by means comprising a continuously rotated cam shaft, an oscillating lever and a pawl and ratchet connection between said lever and a notched disc corresponding to the above mentioned disc G. The use of the relay motor D in accordance with the present invention results in a material simplification of mechanisms through which the printing wheel, selector switch and indexing shaft are given their respective angular adjustments.

The apparatus through which unbalance in a self-balancing measuring and control system will actuate the motor 10 to rebalance the system may well be of one or another of various known forms. The apparatus for the purpose collectively shown diagrammatically in Figs. 1 and 3, by way of example, is of a type and form fully disclosed in the Harrison Patent 2,300,742 of November 3, 1942. In that apparatus, the periodic interruption of the unbalanced current which flows in the potentiometric network 5 when an unbalanced condition obtains, produces a pulsating potential drop across the resistance 16. That potential drop is either in phase with the voltage of the supply lines $L^1$ and $L^2$, or is displaced 180° in phase therefrom, depending on the direction of unbalance. This pulsating potential drop is impressed on the input terminals of the electronic amplifier 1 wherein it is amplified and the amplified quantity is applied to the terminals of one winding 23 or 24 of the reversible motor 10 which, as illustrated, in detail in Fig. 3, also includes a winding 25 connected to the supply lines $L^1$ and $L^2$ through a suitable condenser 26.

The reversible motor 10 is of the induction variety and includes a squirrel cage rotor and two pairs of oppositely disposed field poles on which the windings 23, 24 and 25 are wound. Winding 23 is wound on one field pole of one pair, and winding 24 is wound on the other pole of said pair. Winding 25 is wound on the other pair of field poles and due to the action of condenser 26, the current which flows through the winding 25 will lead the line voltage by approximately 90°. The current supplied the winding 23 by the amplifier 1 is in phase with the supply line voltage and establishes a field in the rotor which is displaced 90° in the forward direction with respect to that established therein by the winding 25. Similarly, the current supplied winding 24 is in phase with the supply voltage but since it is wound on an opposite field pole from that on which the winding 23 is wound, winding 24 establishes a field in the rotor which lags by 90° that established by winding 25. Reaction between the field set up by winding 23 or 24 with that set up by winding 25 establishes a rotating field in the rotor which rotates in one direction or the other dependent upon whether winding 23 or 24 is energized and thus on the direction of potentiometer unbalance. The motor rotor is connected through a suitable gearing or coupling connection (not shown) to the screw threaded shaft 9 so that the contact 7 is adjusted along the slide wire resistance 6 in accordance with the direction of rotation of the rotor. The direction and duration of rotation of the rotor are controlled by the direction and extent of unbalance of the potentiometer so that on motor rotation the contact 7 is adjusted in the proper direction to reduce the potentiometer unbalance.

In order that the speed of motor 10 may be as great as possible without overshooting of the new balance point of the potentiometric network 5 and consequent hunting taking place, means have been provided to insure that the motor speed is reduced to zero as the balance point is reached. This end is obtained by providing the arrangement including the resistor 11 and condenser 17, as shown.

With the resistance 11 and condenser 17 connected as shown, it will be apparent that the thermocouple 2 operates to charge the condenser 17 through the resistance 11 and the electromotive force thus developed between the condenser terminals is compared with the potentiometer electromotive force at the then existing position of the contact 7. The resistance 11 is preferably of such value that the total resistance of the circuit including the thermocouple 2, leads 3, 4a and 4 and the resistance 11 is several times greater than that of the circuit including the potentiometer slide wire 6, resistance 16 and the interrupter contacts 12 and 14 when the latter are in engagement. The operation of this arrangement for preventing hunting is fully described in said Harrison Patent 2,300,742, and need not be further referred to herein.

It is noted, however, that there is no delay means in the circuit through which the condenser 17 and slide wire electromotive forces are opposed so that the amplifier 1 responds substantially immediately to unbalance in said electromotive forces to energize the motor 10 for rotation in one direction or the other, to change thereby the slide wire electromotive force as required to reduce the unbalance and to reduce the motor energization to zero at the instant the balance between the said electromotive forces is reached. In consequence the electromagnetic switch C is closed as soon as the measuring circuit is rebalanced.

The electronic amplifier 1 referred to is illustrated in detail in Fig. 3 and, as shown, includes an electronic valve 29 which is preferably a heater type, high mu, triode having an anode, a cathode, and a control electrode, and having its input circuit connected by conductors 18 and 19 to the terminals of the resistance 16. Anode voltage is supplied the valve 29 from the terminals of a suitable filter 32 which is connected in circuit between the valve 29 and a rectifier 33. The rectifier 33 is a conventional full wave rectifier employing a rectifier valve 34 including two heater type diodes in one envelope. Energizing current is supplied the heater filaments of the diodes from the low voltage secondary winding 35 of a transformer 36 which also includes a line voltage primary winding 37, a high voltage secondary winding 38, and a second low voltage secondary winding 39. The anode of one diode of valve 34 is connected to one terminal of the winding 38 and the anode of the second diode is connected to the other terminal of the winding. The cathodes of the diodes are connected together and through a resistance 40 to the positive terminal of the filter 32, and the negative terminal of the latter is connected to a center tap on the winding 38. The negative terminal of the filter is desirably connected to ground potential, as shown.

The filter 32 includes a condenser 41 which shunts its positive and negative terminals, and has its positive terminal connected to the anode of valve 29 through resistances 42, 43 and 44, and its negative terminal connected directly to the cathode of said valve. As illustrated, the point of engagement of resistances 42 and 43 is connected by a condenser 45 to the negative terminal of the filter and the point of engagement of resistances 43 and 44 is connected by a condenser 46 thereto.

Energizing current is supplied the heater filament of valve 29 from the low voltage transformer winding 39 which also supplies energizing current to the heater filaments of a twin type valve 47. The flow of current through valve 29 is normally maintained at a mean value since the resistance 16 is connected directly across the input circuit thereof, but when a pulsating potential appears across the terminals of resistance 16, the conductivity of valve 29 is alternately increased and decreased resulting in a pulsating potential drop appearing across the resistance 44 in the output circuit of the valve 29.

The output circuit of valve 29 is resistance-capacity coupled to the input circuit of valve 47 through a condenser 48 and a resistance 49 connected across the input circuit of valve 47. Valve 47, is a heater type valve including two triodes in one envelope. Each triode includes anode, cathode, and control electrode elements. For convenience, the triode having the resistance 49 connected across its input circuit will be referred to as the triode $a$, and the second triode will be referred to as the triode $b$.

Anode voltage is supplied the triodes $a$ and $b$ from the terminals of the filter 32 and, as shown, the anode of triode $a$ is connected through a resistance 50 to the point of engagement of resistance 42 and 43 and the anode of triode $b$ is connected through the primary winding 51 of a transformer 52 to the positive terminal of the filter. The cathodes of triodes $a$ and $b$ are connected together and to the negative terminal of the filter.

The output circuit of triode $a$ is resistance-capacity coupled by a condenser 54 and a resistance 55 to the input circuit of triode $b$, and the output circuit of the latter is coupled by transformer 52 to the input circuit of a pair of electronic valves 56 and 57 connected in push-pull. Transformer 52 includes a center-tapped secondary winding 53, each of the terminals of which is connected to a respective control electrode of the valves 56 and 57 and the center tap of which is connected through a biasing resistance to the cathodes of the valves, which, as shown, are connected together. As illustrated, a condenser 58 may desirably be connected across the terminals of the transformer secondary winding 53 for tuning the latter to the frequency it is desired to amplify. Valves 56 and 57 are heater type tetrodes and include anode, cathode, heating filament, control electrode, and screen elements.

Anode voltage may be supplied the valves 56 and 57 directly from the supply conductors $L^1$ and $L^2$, as shown, or may be supplied thereto from a suitable transformer energized by the supply line current, if desired. Winding 23 of motor 10 is connected in the anode circuit of valve 56 and winding 24 of the motor is connected in the anode circuit of the valve 57. In operation, when a pulsating potential drop is produced across resistance 16 as a result of potentiometer unbalance, the resulting amplified pulsating current flow through the transformer primary winding 51 will cause the induction of an alternating voltage across the terminals of the transformer secondary winding 53, which voltage is impressed on the input circuits of valves 56 and 57. The alternating voltage which appears across the terminals of the transformer winding 53 swings the potentials of the control electrodes of the valves 56 and 57 in opposite phase at a frequency corresponding to the supply line frequency, and thereby renders one valve or the other non-conductive depending upon the phase of the voltage of the transformer secondary winding 53 with respect to the supply line voltage. The resulting deenergization of one motor winding 23 or 24 and the increased energization of the other operates to produce rotation of the motor in one direction or the other depending upon the phase of the pulsating potential drop produced across resistance 16 and thereby the direction of potentiometer unbalance. As illustrated, a condenser 26a may desirably be connected between the anodes of valves 56 and 57 to increase the available torque of motor 10.

While in the ordinary use of the present invention the relay motor employed may well be a simple rotatable electric motor, such as the above mentioned motor D, the relay motor may take other forms. Thus, for example, the servo-motor may be an electromagnetic relay of the long known type shown in Fig. 4 and comprising a ratchet wheel S intermittently rotated by a pawl T connected to the pivoted armature T' of an electromagnet $T^2$ during periods in which the latter is energized. The ratchet wheel S may be coaxial with and rigidly secured to the disc G. The energizing circuit for the electromagnet $T^2$ includes an electromagnetic switch C similar in construction and in the mode of energization and deenergization to the switch C previously described. One terminal of the switch C is connected to a contact $t$ carried by the pivoted armature T' and cooperating with a stationary contact $t'$ to close and open alternatively the energizing circuit for the electromagnet $T^2$ during any period in which the switch C is closed. As shown, a spring $T^3$ biases the armature T' for movement away from the core of the electromagnet $T^2$ into the position in which the movable contact $t$ engages the stationary contact $t'$.

With the switch C of Fig. 4 closed when the contact $t'$ is engaged by the contact $t$, electromagnet $T^2$ is energized and attracts the armature which is thereby moved to separate the contact $t$ from the contact $t'$ and thus deenergizes the electromagnet $T^2$. The armature T' then turns back into the position in which the contact $t$ engages the contact $t'$. On each movement of the armature T' in the direction in which it moves when the electromagnet $T^2$ is energized, the pawl T advances the ratchet wheel S one tooth.

Notwithstanding the substantial specific differences between the two relay motor forms illustrated and described by way of example herein, both forms are alike in that in each the relay motor is energized and deenergized as a result of current variations in the energizing circuit of the rebalancing motor which occur as that motor is energized and deenergized. As those skilled in the art will understand, the various elements of the combination disclosed may be replaced by other elements, and in such case the replacement of one element may require a modification in some other element. For example, when the rebalancing motor shown is replaced by a rebalancing motor in which the energization and deenergization of the motor result in current variations different from those in the motor 10, the responsive element C may take other forms.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. Self balancing measuring and recording apparatus comprising in combination, a measuring circuit including a relatively adjustable slide wire and slider contact, means for connecting said measuring circuit to a circuit energizing source of current and means for connecting a source of voltage to be measured to said measuring circuit, a reversible electric rebalancing motor for relatively adjusting said contact and slide wire and having energizing terminals, motor energizing means including means for supplying energizing currents to said motor through said terminals and means responsive to unbalance in said circuit for regulating the currents flowing through different terminals and thereby operatively energizing and deenergizing said motor, accordingly as said circuit is respectively unbalanced and rebalanced, mechanism to be operated when said circuit is rebalanced, a second motor actuated when energized to operate said mechanism, and a second energizing means including means responsive to variations in said currents for energizing and deenergizing said second motor when the rebalancing motor is deenergized and energized respectively.

2. Apparatus as specified in claim 1, in which the means for supplying energizing currents to said rebalancing motor is arranged to supply alternating currents of the same phase through each of two different terminals of the rebalancing motor and in which said second energizing means comprises an electromagnetic switch having its winding connected between said two terminals.

3. Apparatus as specified in claim 1, in which the said mechanism to be operated includes a printing element movable into and out of printing position and includes a selector switch for connecting a plurality of voltage sources one at a time in regular sequence to the measuring circuit and in which said second motor on each of its actuations moves said element into and out of its printing position and adjusts said selector switch.

4. Self balancing measuring and control apparatus comprising in combination, a normally balanced circuit adapted to be unbalanced by a change in a controlling condition, a reversible electric motor for rebalancing said circuit upon unbalance thereof, said motor having motor energizing terminals, motor energizing means including means for supplying energizing current to said motor through said terminals and means responsive to unbalance in said circuit for regulating the currents flowing through said terminals and thereby operatively energizing and deenergizing said motor, accordingly as said circuit is respectively unbalanced and rebalanced, mechanism to be operated when said circuit is rebalanced, a second motor actuated when energized to operate said mechanism, and a second motor energizing means including means responsive to variations in said currents for energizing and deenergizing said second motor when the rebalancing motor is deenergized and energized respectively.

5. Self balancing measuring and control apparatus comprising in combination an electric circuit the state of equilibrium of which is adapted to be changed by variations in a controlling condition, an electronic amplifying means comprising an input portion operative to amplify undulating electric signals and an output portion operative to supply under one condition of operation of the apparatus undulating electric current of predetermined frequency, means responsive to the state of equilibrium in said circuit for applying to said input portion an undulating signal which is of said predetermined frequency and variable in accordance with variations in said controlling condition, control means connected to said output portion selectively responsive to and actuated by current of the said predetermined frequency, mechanism to be operated when said circuit is in a state of equilibrium, a second motor actuated when energized to operate said mechanism, and energizing means including means responsive to variations in the currents in said output portion for energizing and deenergizing said second motor when the rebalancing motor is deenergized and energized respectively.

6. Apparatus as specified in claim 1, in which the said mechanism to be operated is a printing element movable into and out of its printing position, and in which said second motor on each of its actuations moves said element into and out of its printing position.

7. Apparatus as specified in claim 1, in which the said mechanism to be operated is a selector switch for connecting a plurality of voltage sources one at a time in regular sequence to the measuring circuit and in which said second motor on each of its actuations adjusts said selector switch.

JOHN A. CALDWELL.

REFERENCES CITED

The following references are of record in the file of this patent:

UNITED STATES PATENTS

| Number | Name | Date |
|---|---|---|
| 1,508,796 | Kaminski | Sept. 16, 1924 |
| 1,985,982 | Edwards | Jan. 1, 1935 |
| 2,280,019 | Alexandersson et al. | Apr. 14, 1942 |
| 2,292,063 | Dome | Aug. 4, 1942 |
| 2,357,205 | Keeler | Aug. 29, 1944 |